US008719270B2

(12) United States Patent
Agarwal et al.

(10) Patent No.: US 8,719,270 B2
(45) Date of Patent: *May 6, 2014

(54) UTILIZING METADATA GENERATED DURING XML CREATION TO ENABLE PARALLEL XML PROCESSING

(75) Inventors: Manoj K. Agarwal, Noida (IN); Manish A. Bhide, New Delhi (IN); Srinivas K. Mittapalli, Secunderabad (IN); Sriram K. Padmanabhan, San Jose, CA (US); Girish Venkatachaliah, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/413,838

(22) Filed: Mar. 7, 2012

(65) Prior Publication Data

US 2012/0166460 A1    Jun. 28, 2012

Related U.S. Application Data

(63) Continuation of application No. 12/893,351, filed on Sep. 29, 2010.

(51) Int. Cl.
*G06F 17/30* (2006.01)
(52) U.S. Cl.
USPC .......................................... 707/737; 707/756
(58) Field of Classification Search
CPC ............................................. G06F 17/309011
USPC ................................................. 707/737, 756
See application file for complete search history.

(56) References Cited

U.S. PATENT DOCUMENTS

| | | | |
|---|---|---|---|
| 2006/0117033 A1* | 6/2006 | Apparao et al. | 707/100 |
| 2006/0161531 A1* | 7/2006 | Khandelwal et al. | 707/3 |
| 2008/0059511 A1 | 3/2008 | Summers et al. | |
| 2008/0086442 A1* | 4/2008 | Dasdan et al. | 707/1 |
| 2008/0132257 A1* | 6/2008 | Fok et al. | 455/466 |
| 2009/0006944 A1 | 1/2009 | Dang et al. | |
| 2009/0089658 A1 | 4/2009 | Chiu et al. | |

OTHER PUBLICATIONS

Wei Lu, et al., "Parallel XML Processing by Work Stealing", SOCP '07, Jun. 26, 2007, Monterey, California, USA, 7 pages.
Yu Wu, et al., "A Hybrid Parallel Processing for XML Parsing and Schema Validation", Presented at Balisage: The Markup Conference 2008, Montreal, Canada, Aug. 12-15, 2008. In Proceedings of Balisage: The Markup Conference 2008. Balisage Series on Markup Technologies, vol. 1 (2008).
Adobe Systems Incorporated, "XMP Adding Intelligence to Media", XMP Specification, Adobe, Sep. 2005; Corporate Headquarters 345 Park Avenue, San Jose, CA 95110-2704; Copyright 2000-2005.
Wei Lu, et al., "Parallel XML Processing by Work Stealing", Indiana University, Slides from SOCP '07 Conference, Jun. 26, 2007, Monterey, California, USA.

\* cited by examiner

*Primary Examiner* — Fred I Ehichioya
*Assistant Examiner* — Kris Mackes
(74) *Attorney, Agent, or Firm* — Susan Murray; SVL IP Law Edell, Shapiro & Finnan, LLC

(57) ABSTRACT

A method, computer program product, and system for enabling parallel processing of an XML document without pre-parsing, utilizing metadata associated with the XML document and created at the same time as the XML document. The metadata is used to generate partitions of the XML document at the time of parallel processing, without requiring system-intensive pre-parsing.

20 Claims, 4 Drawing Sheets

UTILIZING METADATA GENERATED DURING XML CREATION TO ENABLE PARALLEL XML PROCESSING

CROSS-REFERENCE TO RELATED APPLICATIONS

This application is a continuation of U.S. patent application Ser. No. 12/893,351, entitled "Utilizing Metadata Generated During XML Creation to Enable Parallel XML Processing" and filed Sep. 29, 2010, the disclosure of which is incorporated herein by reference in its entirety.

BACKGROUND

1. Technical Field

The present invention relates generally to XML processing, and more particularly to systems, methods and computer program products for improving parallel processing of XML documents.

2. Discussion of Related Art

The eXtensible Markup Language (XML) is widely used in web services, messaging systems, databases, and document processing. The processing of XML documents is often a performance bottleneck in computer systems and applications, particularly if the XML documents are large (e.g., file sizes greater than one gigabyte). Many systems designed primarily for handling relational data have difficulty processing such large XML documents, leading to scalability problems, which can be alleviated to some degree if parallel processing is enabled. Moreover, with the increasing popularity of multi-processor systems (e.g., multi-core processors) used in computers and computer systems, there are more opportunities to process XML documents in parallel. Parallel processing of XML documents can be difficult, however. For example, an XML document typically must be partitioned in order to achieve parallel processing, and this partitioning generally requires pre-processing (pre-parsing) of the document in order to determine the schema and thus appropriate partition points within the document. Because pre-parsing cannot be performed in parallel, the pre-parsing step itself creates significant performance overhead on systems, and limits the advantages of parallel processing.

BRIEF SUMMARY

Accordingly, embodiments of the present invention include a method, computer program product and a system for enabling parallel processing of an XML document without pre-parsing, where the XML document has associated metadata, comprising, in response to a request for processing an XML document, determining a number N that is the number of XML consumers available to process the XML document, analyzing metadata associated with the XML document to generate N partitions of the XML document without parsing, and processing the partitions in parallel, where each XML consumer processes one of the partitions.

Further embodiments include a method, computer program product and a system for enabling parallel processing of an XML document without pre-parsing, where the XML document has associated metadata, comprising generating an XML document from input data, generating metadata associated with the XML document, where the metadata comprises information that enables the XML document to be partitioned without parsing into independent partitions for parallel processing, and storing the XML document and the metadata.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
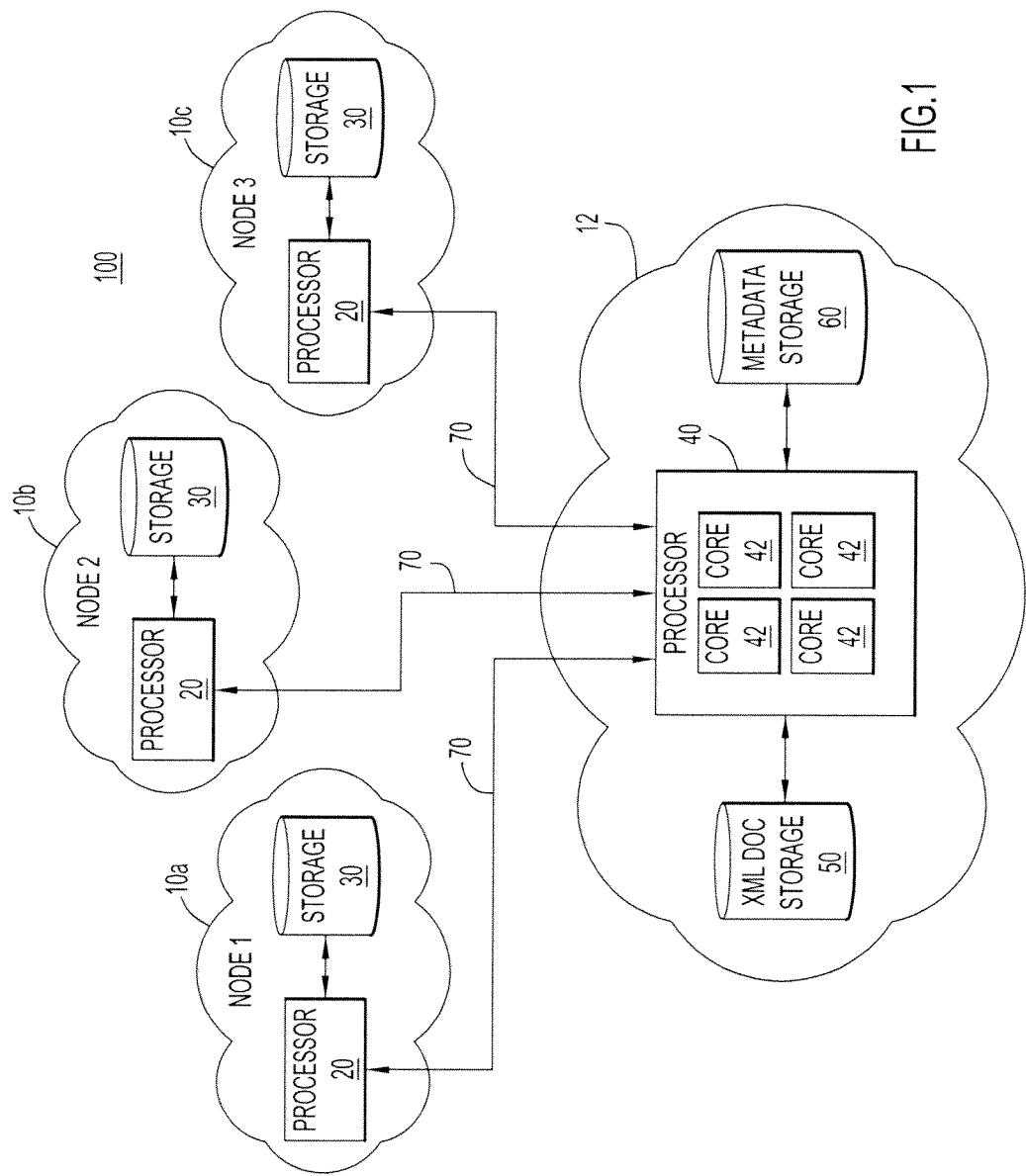
FIG. 1 is a block diagram illustrating an exemplary computer system having multiple processors according to an embodiment of the present invention.

Referring now to the Figures, an exemplary computer system 100 according to embodiments of the present invention is illustrated in FIG. 1. The exemplary computer system 100 comprises multiple processing nodes 10, 12, each of which is capable of independently processing an XML document or a portion thereof. The system 100 may be a distributed computer system, cloud-based system, clustered database, or any other suitable multiple-processor system in which the present embodiments may be used. Each of the processing nodes 10a, 10b, 10c comprises a processor 20 and storage 30, where, for example, XML documents or other data objects may be stored. Processing node 12 comprises a multi-core processor 40 having multiple cores 42 and XML document storage 50, and may also comprise metadata storage 60, depending on whether the metadata is stored with the XML document or not. The processing nodes 10, 12 are communicatively connected to each other, for example, via communications channels 70.

Nodes 10, 12, processors 20, and multi-core processor 40 may each be implemented in the form of a processing system, or may be in the form of software. They can each be implemented by any quantity of conventional or other computer systems or devices (e.g., computer terminals, personal computers of all types (e.g., including tablets, laptops, netbooks, etc.), cellular telephones/personal data assistants of all types and may include any commercially available operating systems for all types of computer hardware and any commercially available or custom software (e.g., browser software, communications software, word processing software, etc.). These systems may include processors, memories (e.g., RAM, cache, flash, ROM, solid-state, hard-disk, etc.), internal or external communications devices (e.g., modem, network adapter, etc.), I/O interfaces, output devices (e.g., displays, printers, etc.), and input devices (e.g., physical keyboard, touch screen, mouse, trackpad, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.).

Storage 30, 50, 60 may be implemented by any quantity of any type of conventional or other databases (e.g., network, hierarchical, relational, object, etc.) or storage structures (e.g., files, data structures, web-based storage, disk or other storage, etc.), on any conventional or other memory or storage device, and may be volatile (e.g., RAM, cache, flash, etc.), or non-volatile (e.g., ROM, hard-disk, optical storage, etc.), and include any suitable storage capacity.

The computer system 100 may include additional servers, clients, and other devices not shown, and individual components of the system may occur either singly or in multiples. For example, there may be more than four nodes 10, 12 in the system, more than one multi-core processor 40 in the system, more than four cores 42 in the multi-core processor, and any of the processors 20 may themselves be multi-processors, and have multiple CPUs, multiple cores, multiple dies comprising multiple processors, etc. It is understood that any of the various components of the computer system 100 may be local to one another, or may be remote from and in communication with one or more other components via any suitable communication means 70, for example a network such as a WAN, a LAN, Internet, Intranet, mobile wireless, etc.

Figure 2:
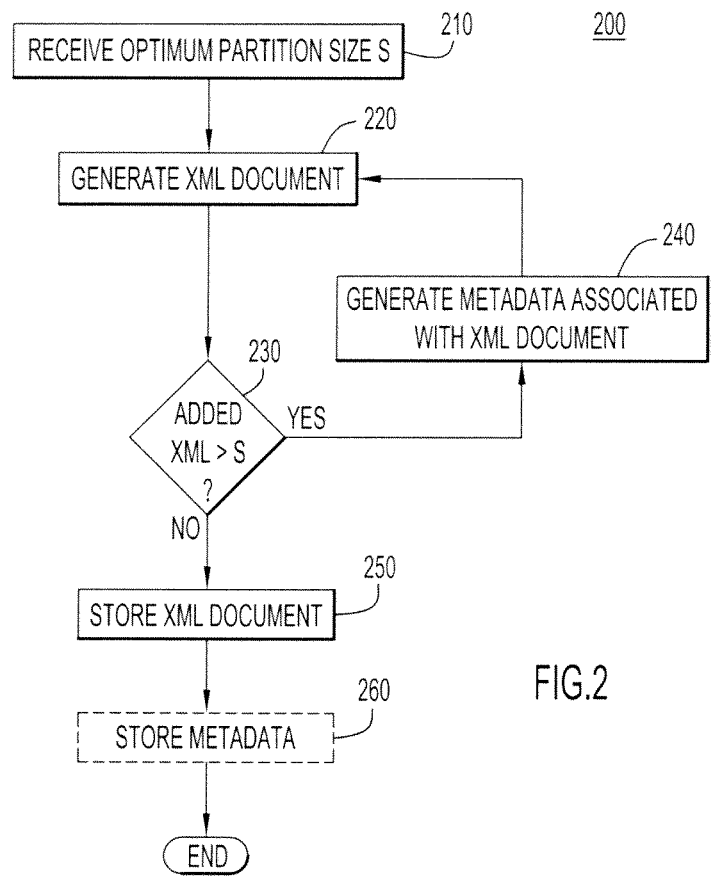
FIG. 2 is a flowchart depicting an exemplary generation of metadata associated with an XML document, according to embodiments of the present invention.

Referring now to FIG. 2, reference numeral 200 generally designates a flow chart depicting an exemplary generation of metadata associated with an XML document, according to an embodiment of the present invention. This may be carried out by any suitable server, client or other device capable of generating or producing an XML document (herein called the "generator"), and may be carried out by, e.g., the multi-core processor 40 of FIG. 1, one of the processors 20 of FIG. 1, or any other device, etc.

In step 210, the generator receives or is provided with optimum XML document processing parameters, which comprise an optimum partition size S of the XML document that can be processed on a parallel processor. The generator does not need to know any details about the number or type of the eventual consumers of the XML document (the "XML consumers"), and may operate with a general directive such as an optimum partition size S of, e.g., 1 gigabyte (GB). The optimum partition size S may be any suitable size, and may be, e.g., one gigabyte, ten gigabytes, 100 gigabytes, etc. For ease of description, the present embodiments will be described with reference to an optimum partition size S of one gigabyte, however it is understood that the present embodiments are not limited to this size.

In step 220, the generator begins to generate the XML document, and keeps track of the size of the XML document as it is generated. In step 230, the generator determines if the XML data added to the XML document is greater than S, and if not, proceeds to step 250 and stores the XML document without generating metadata (because no partitioning is needed). If yes, then the generator in step 240 generates metadata associated with the XML document, and the generator cycles back to step 220 to continue generating the XML document, and then again in step 230 determines if the added XML data is greater than S. Because the value of S is relatively large based on available processing power, the amount of metadata generated in this process will be relatively small.

The XML document may be stored with the metadata or separately from it. For example, the metadata may be stored separately from the XML document, as shown by optional step 260 in process 200, and then retrieved from a storage repository when it is time to process the XML document. Or, for example, the metadata may be stored in the XML document, e.g., inside a character data (CDATA) section at the start of the document (e.g., after the start tag or the root node), or may be embedded in a specialized tag such as "<MDATA>" that may be, e.g., present at the head of the XML document so that it is easily fetched by an XML consumer. XML consumers that utilize the present embodiments would be able to find and utilize the metadata, while other XML consumers could safely ignore the metadata information, e.g., by treating it as any other comment.

The metadata may comprise information such as the start and end location of each CDATA section in the XML document, size information (e.g., average, minimum, maximum, etc.) of sub-trees rooted at different positions in the XML document, etc. The metadata may also comprise set information about the XML document, for example, one or more of the following: the start location of the sub-tree rooted immediately below the root node (or some other node of interest) in the XML document; the XPath of the root of this sub-tree; and the number of sub-tree information present in the set. The sub-trees are selected such that they divide the XML document into approximately equal sub-divisions. For example, the metadata may comprise the start locations of one or more nodes that are evenly spaced throughout the XML document.

Figure 3:
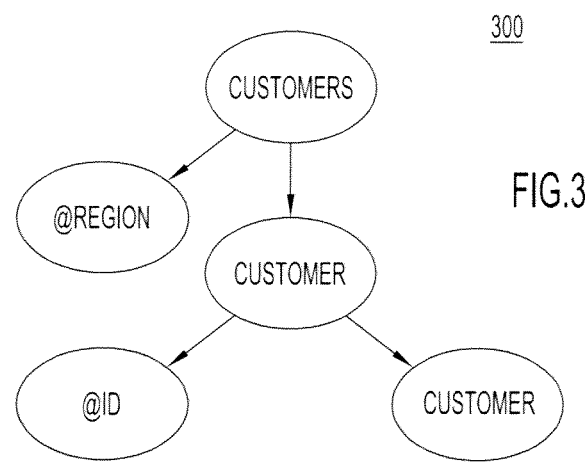
FIG. 3 is a diagram illustrating an exemplary XML schema, according to an embodiment of the present embodiment.

Referring now to FIG. 3, reference number 300 generally designates an exemplary XML schema, according to an embodiment of the present embodiment. This schema is rooted at "customers", and the XML document might have, e.g., 1000 "customer" sub-trees below root, and many more "customer" sub-trees below /customers/customer. If the XML document is, for example four gigabytes, the metadata could include the start and end location of the CDATA section(s) in the XML document, the start location of \customers\customer sub-tree near the 0.5 GB location and the following locations: 1 GB, 1.5 GB, 2 GB, 2.5 GB, 3 GB and 3.5 GB, and the total number of sub-tree information is 7.

Figure 4:
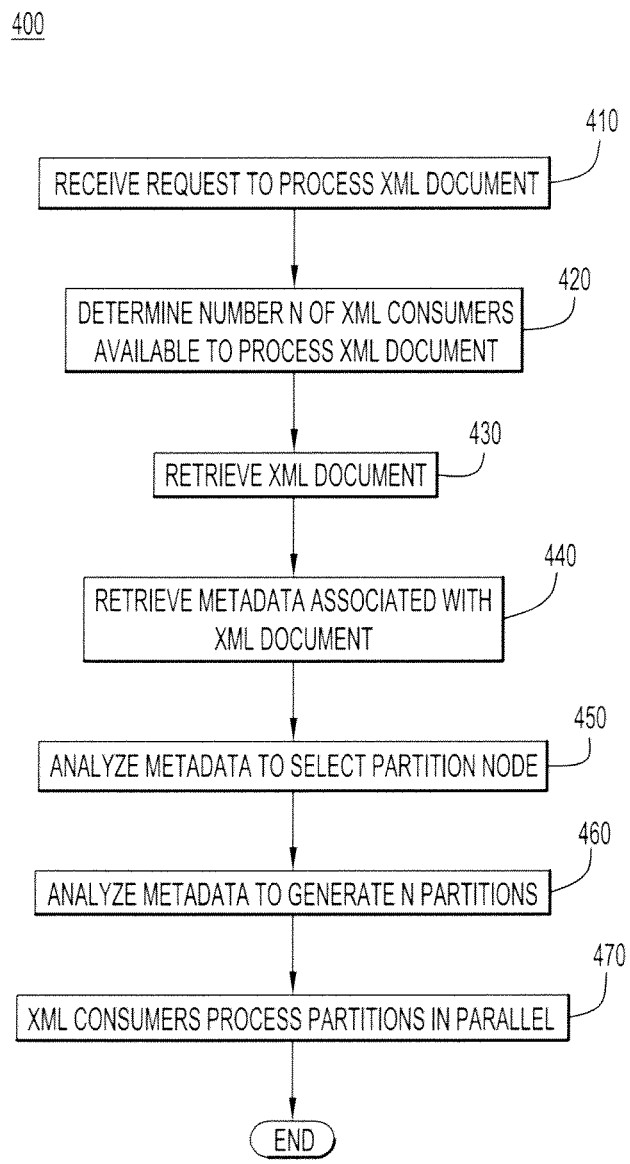
FIG. 4 is a flowchart depicting an exemplary partitioning of an XML document using metadata associated with an XML document, according to embodiments of the present invention.

Referring now to FIG. 4, reference numeral 400 generally designates a flow chart depicting an exemplary partitioning of an XML document using metadata associated with an XML document, according to an embodiment of the present invention. This may be carried out by any suitable server, client or other device capable of processing an XML document (herein called the "system"), and may be carried out by, e.g., the system of FIG. 1.

In step 410, the system receives a request to process an XML document, and in step 420 determines the number N of XML consumers available to process the XML document. An XML consumer may be hardware (e.g., a server, client, processor, or other device) or software (e.g., an application, task, thread or portion thereof) that independently consumes or processes XML, e.g., accepts an XML object as input. For example, an Extract, Transform, Load (ETL) process that extracts data from XML documents for storage in a database (e.g., the IBM WebSphere® DataStage™ XML pack; WebSphere® and DataStage™ are trademarks of International Business Machines Corporation) may be considered an XML consumer. Also for example, in the exemplary system of FIG. 1, each node 10, 12 or each processor 20, 40 may be considered as an XML consumer, because each node is capable of independently processing XML documents. Or, for example, the multi-core processor 40 may be considered as comprising four XML consumers (the cores 42) because each core is capable of independently processing XML documents. For ease of description, the present embodiments will be described with reference to four XML consumers (N=4), however it is understood that the present embodiments are not limited to this number of consumers or partitions.

In step 430, the system retrieves the XML document, for example from XML document storage repository 50, or as input from another device, or in any other suitable fashion. If necessary (e.g., the metadata is not stored inside the XML document), the system in step 440 retrieves the metadata associated with the XML document, for example from metadata storage 60, or from any other suitable source. In step 450, the system analyzes the metadata, and uses it to select a partition node, e.g., \customers\customer, and in step 460 generates N partitions, which in step 470 are processed in parallel by the XML consumers. The partioning 400 then ends.

Figure 5:
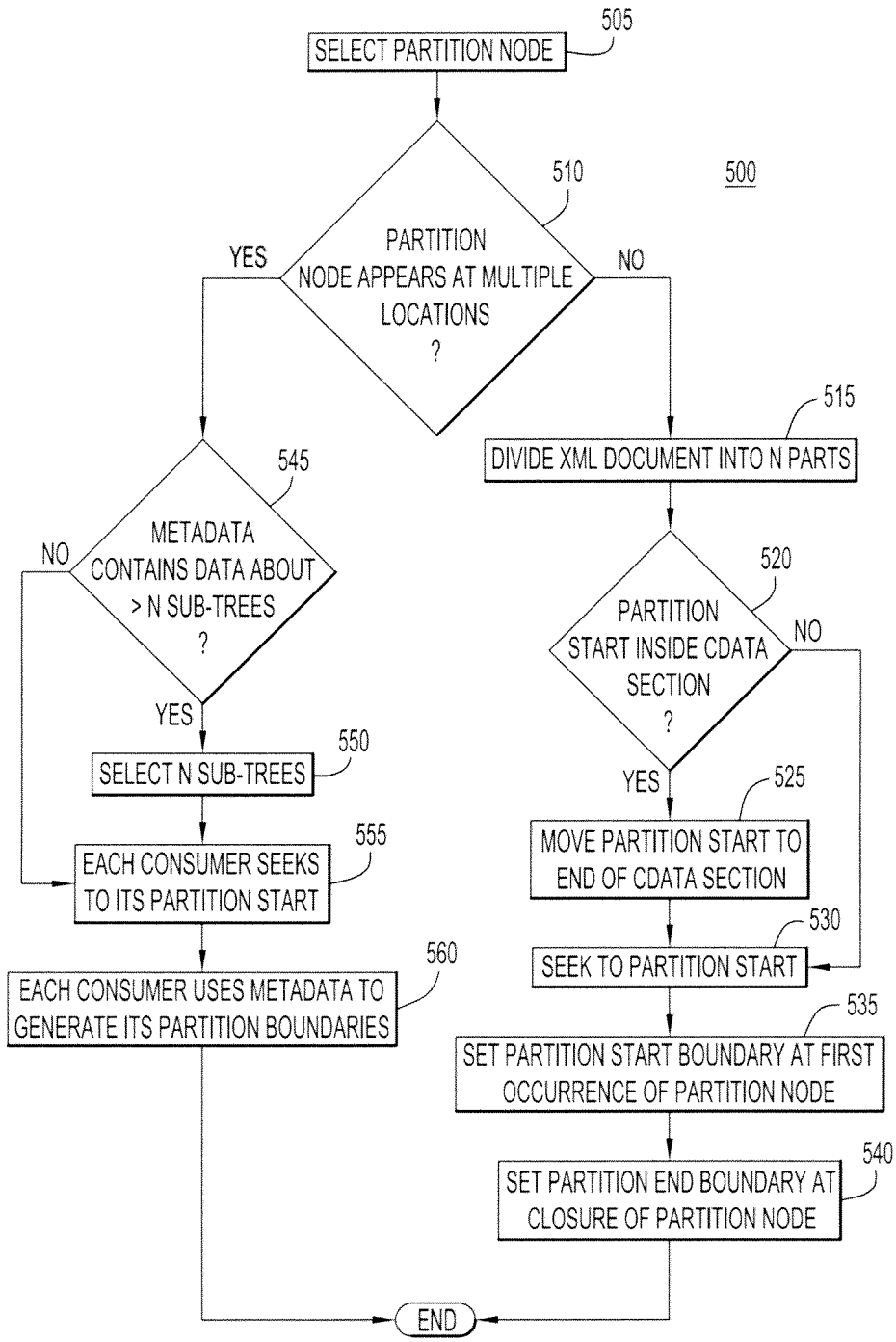
FIG. 5 is a flowchart depicting another exemplary partitioning of an XML document using metadata associated with an XML document, according to embodiment of the present invention.

Referring now to FIG. 5, reference numeral 500 generally designates a flow chart depicting another exemplary partitioning of an XML document using metadata associated with an XML document, according to an embodiment of the present invention. The method 500 may be carried out by any suitable server, client or other device capable of processing an XML document (herein called the "system"), and may be carried out by, e.g., the system of FIG. 1. This partitioning may be considered in certain implementations to be an exemplary embodiment of steps 450 and 460, as previously described.

In step 505, the system selects a node in the XML document as the partition node, e.g., \customers\customer. The system then determines in step 510 if the partition node appears at multiple locations within the XML document (e.g., having different XPaths). For example, in the exemplary schema shown in FIG. 3, the selected "customer" partition node appears at two locations with different XPaths: /customers/customer and /customers/customer/customer. If the answer to step 510 is no, then in step 515 the system divides the XML document into N parts, e.g., given a four GB XML document, with N=4, the first partition will span from 0 to 1 GB, the second partition will span from 1 GB to 2 GB, the third partition will span from 2 GB to 3 GB, and the fourth partition will span from 3 GB to 4 GB. In step 520, the system checks the metadata to determine if the partition start lies within a CDATA section. If not, then the system proceeds to step 530. If yes, then in step 525 the partition start is moved to the end of the CDATA section, and the system proceeds to step 530. Although the method refers specifically to character data (CDATA) sections, there may be other XML document sections that are desirably kept continuous in a partition, such as, e.g., comment sections and nested node definitions. Thus, in an alternate embodiment, steps 520 and 525 may be modified to move the partition start if it lies within another one of these sections. In step 530, the system seeks to the partition start and looks for the first occurrence of the partition node. Once the node is found, then in step 535 the system sets the partition start boundary, and then in step 540 sets the partition end boundary at the closure of the partition node. The process 500 then ends.

If the answer to step 510 is yes, then in step 545 the system determines whether the metadata contains data about more than N sub-trees. If yes, then in step 550 the system selects N sub-trees out of the number of sub-trees in the metadata, and then proceeds to step 555, and if no, then the system proceeds to step 555. In step 555, each consumer seeks the start of its partition, for example, by seeking its nearest sub-tree and then doing a "shallow parse" from that point to reach the partition start. In step 560, each consumer uses the metadata to generate its partition boundaries, and then the process ends. The seeking is needed when the XML consumers have access to the same XML document file, because they must each locate their respective partition to process.

An illustrative example of steps 555 and 560, in which the XML document is 4 GB in size, the meta-data has information about 2 sub-trees, and N=4 follows:

> The first consumer starts generating its partition from the 0th GB location, and consumes until it reaches the end of the sub-tree rooted at partition node and it exceeds 1 GB;
>
> The second consumer does shallow parsing from the 0th GB location till it reaches beyond 1 GB and encounters the start of partition node, and then generates its partition from that point until the start of the third partition as per meta-data;
>
> The third consumer starts generating its partition from the second sub-tree location given in the meta-data, and processes until it reaches the end of the sub-tree rooted at partition node and it exceeds 3 GB; and
>
> The fourth consumer does shallow parsing from the second sub-tree location given in the meta-data, until it reaches beyond 3 GB and encounters the start of partition node, and then generates its partition from that point until the end of the XML document.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., an object oriented programming language such as Java, Smalltalk, C++ or the like, or a conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of enabling parallel processing of an XML document without pre-parsing, wherein the XML document has associated metadata, comprising:
   in response to a request for processing an XML document, determining a number N that is the number of XML consumers available to process the XML document;
   analyzing metadata associated with the XML document generated at a predetermined size interval of the XML document during the generation of the XML document, wherein the metadata identifies at least N partition points evenly distributed throughout the XML document;
   generating N partitions of the XML document corresponding to the at least N partition points without parsing the XML document; and
   processing the partitions in parallel, wherein each XML consumer processes one of the partitions.

2. The method of claim 1, wherein the metadata is stored in the XML document.

3. The method of claim 1, wherein the metadata is stored separately from the XML document, and wherein the method further comprises:
   prior to said analysis, and in response to the request for processing an XML document, retrieving the metadata associated with the XML document from a storage repository.

4. The method of claim 1, wherein the metadata comprises start and end locations of CDATA sections in the XML document.

5. The method of claim 4, further comprising:
   using the metadata to directly seek to the start of a particular partition using a particular CDATA section.

6. The method of claim 1, wherein the metadata comprises set information about the XML document including:
   a start location of a sub-tree rooted immediately below a node of interest in the XML document; and
   an XPath expression of the root of the sub-tree.

7. The method of claim 6, wherein said generation further comprises:
   each XML consumer using the set information to generate the partition it will process in parallel with the other XML consumers by using a combination of seek and shallow parsing.

8. The method of claim 1, wherein the predetermined size interval is greater than or equal to 10 gigabytes.

9. A computer-implemented method of enabling parallel processing of an XML document without pre-parsing, wherein the XML document has associated metadata, comprising:
   generating an XML document from input data;
   generating metadata associated with the XML document at a predetermined size interval of the XML document during the generation of the XML document, wherein the metadata comprises information identifies at least N partition points evenly distributed throughout the XML document that enables the XML document to be partitioned without parsing into N partitions of the XML document corresponding to the at least N partition points for parallel processing; and
   storing the XML document and the metadata.

10. The method of claim 9, wherein the metadata is stored in the XML document.

11. The method of claim 9, wherein the metadata comprises the start locations of one or more nodes that are evenly spaced throughout the XML document.

12. The method of claim 9, wherein the metadata comprises start and end locations of CDATA sections in the XML document.

13. The method of claim 9, wherein the metadata comprises start and end locations of one or more comment sections in the XML document.

14. The method of claim 9, wherein the metadata comprises start and end locations of nested node definitions in the XML document.

15. The method of claim 9, wherein the metadata comprises set information about the XML document including:
   a start location of a sub-tree rooted immediately below a node of interest in the XML document; and
   an XPath expression of the root of the sub-tree.

16. The method of claim 9, wherein the predetermined size interval is greater than or equal to 1 gigabytes.

17. The method of claim 9, wherein the predetermined size interval is greater than or equal to 10 gigabytes.

18. A computer-implemented method of enabling parallel processing of an XML document without pre-parsing, wherein the XML document has associated metadata, comprising:
   in response to a request for processing an XML document, determining a number N that is the number of XML consumers available to process the XML document;
   analyzing metadata associated with the XML document generated at a predetermined size interval of the XML document during the generation of the XML document to generate N partitions of the XML document without parsing; and
   processing the partitions in parallel, wherein each XML consumer processes one of the partitions, wherein the predetermined size interval is greater than or equal to 1 gigabyte.

19. The method of claim 18, wherein the metadata is stored in the XML document.

20. The method of claim 18, wherein the metadata is stored separately from the XML document, and wherein the method further comprises:
   prior to said analysis, and in response to the request for processing an XML document, retrieving the metadata associated with the XML document from a storage repository.

* * * * *